(12) United States Patent
Grimmett

(10) Patent No.: US 7,220,080 B1
(45) Date of Patent: May 22, 2007

(54) SAG CORRECTION SYSTEM

(76) Inventor: James G. Grimmett, 3027 16th Pl., Forest Grove, OR (US) 97116

( * ) Notice: Subject to any disclaimer, the term of this patent is extended or adjusted under 35 U.S.C. 154(b) by 126 days.

(21) Appl. No.: 11/148,115

(22) Filed: Jun. 8, 2005

(51) Int. Cl.
*F16L 55/00* (2006.01)

(52) U.S. Cl. ............................. 405/184.1; 405/184.4; 138/97

(58) Field of Classification Search ............ 405/184.1, 405/184.4, 184.3, 154.1; 138/97
See application file for complete search history.

(56) References Cited

U.S. PATENT DOCUMENTS

| | | | |
|---|---|---|---|
| 1,866,381 A | | 7/1932 | Ward |
| 3,718,978 A | * | 3/1973 | Van Koevering et al. ................. 405/184.1 |
| 4,309,128 A | * | 1/1982 | Williams ................. 405/184.3 |
| 4,457,647 A | * | 7/1984 | Dusette et al. ........... 405/184.1 |
| 4,657,436 A | * | 4/1987 | Yarnell .................... 405/184.1 |
| 5,522,699 A | | 6/1996 | Smit |
| 6,588,983 B1 | * | 7/2003 | Tenbusch, II ............ 405/184.1 |
| 6,619,886 B1 | | 9/2003 | Barrington |
| 6,755,592 B2 | | 6/2004 | Janssen |

* cited by examiner

*Primary Examiner*—Frederick L. Lagman
(74) *Attorney, Agent, or Firm*—Edward P. Dutkiewicz

(57) ABSTRACT

A housing has a central recessed area with a first end and a second end. Each end has an inside rim with at least one aperture there through. The housing has an outside end with an outside end rim with at least one aperture there through. The housing has a central portion with a full circumference. At least one elastomeric pad has an upper face and a lower face. The upper face is coupled to the housing. At least one lifting member are coupled to the housing.

11 Claims, 4 Drawing Sheets

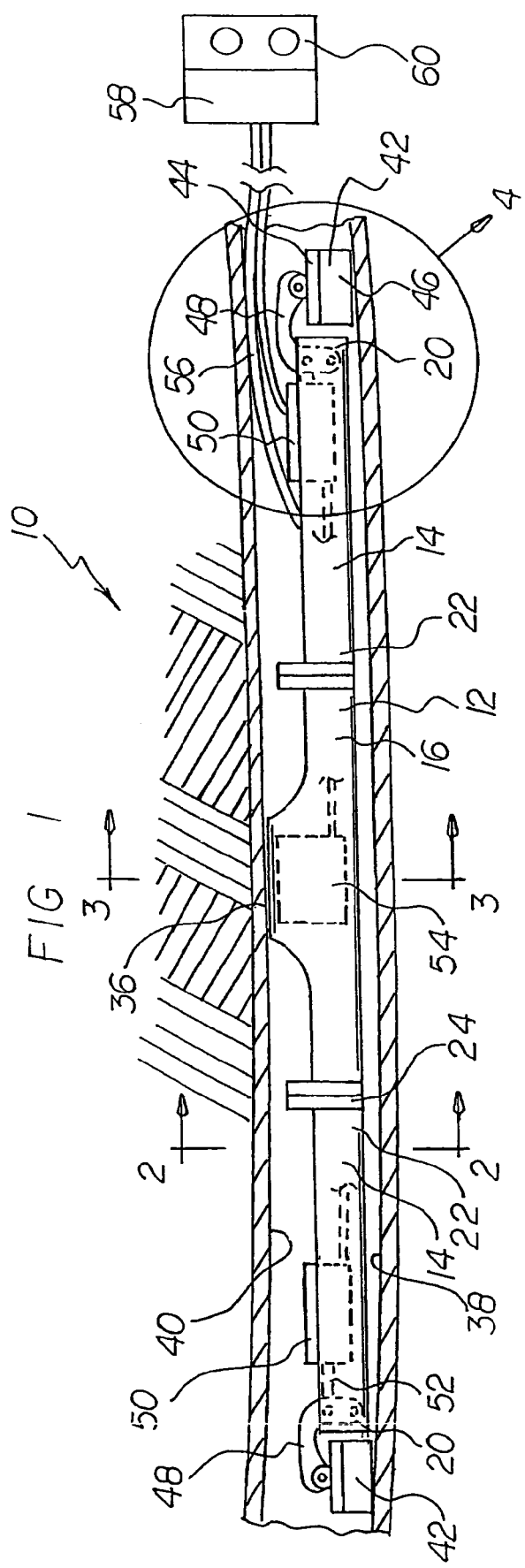
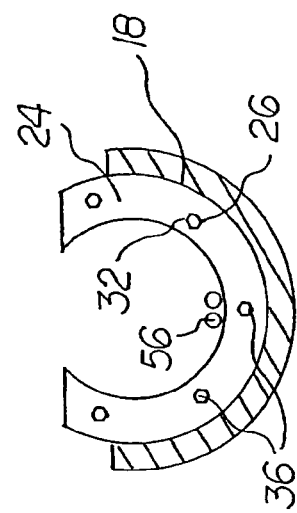
FIG 1
FIG 2

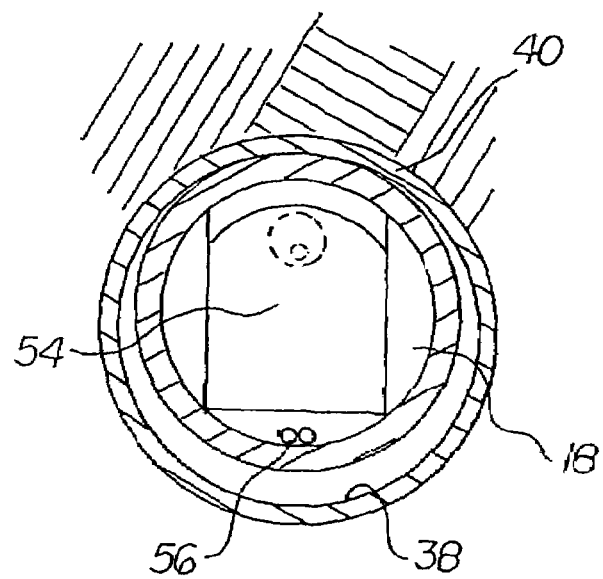
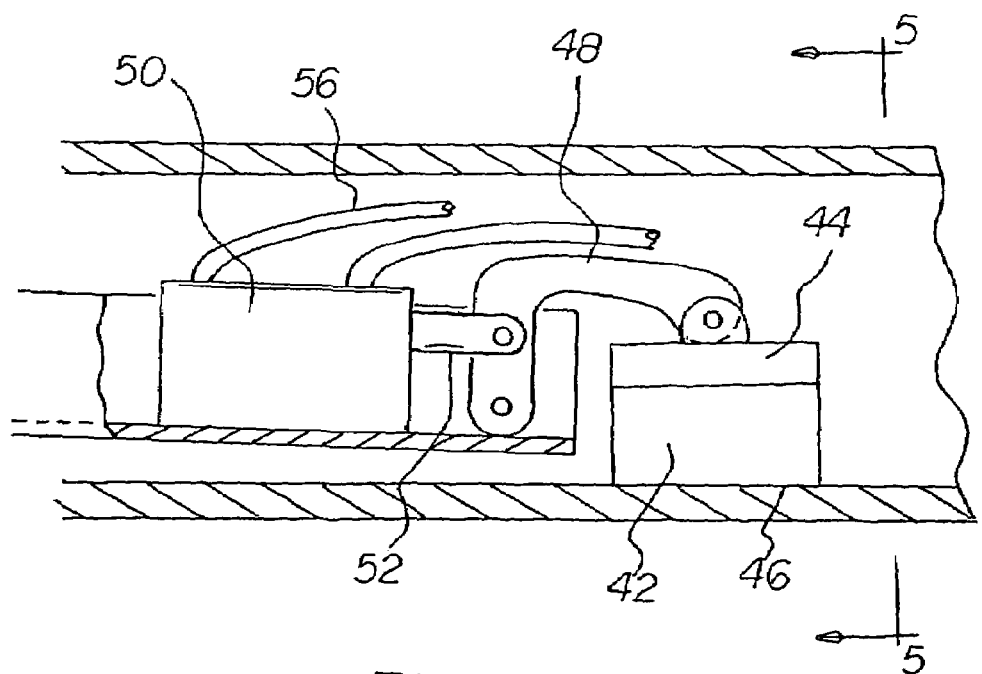

FIG 5
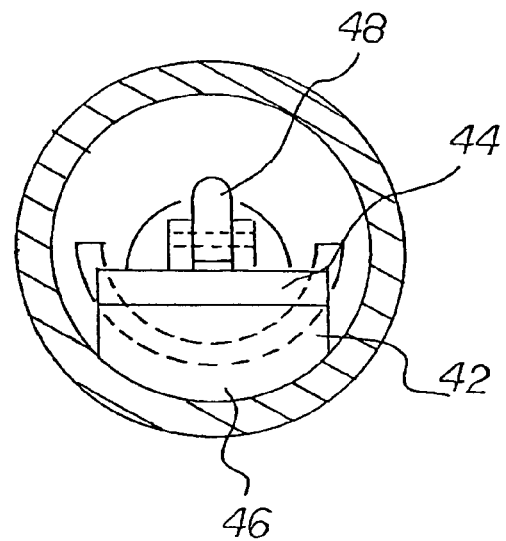
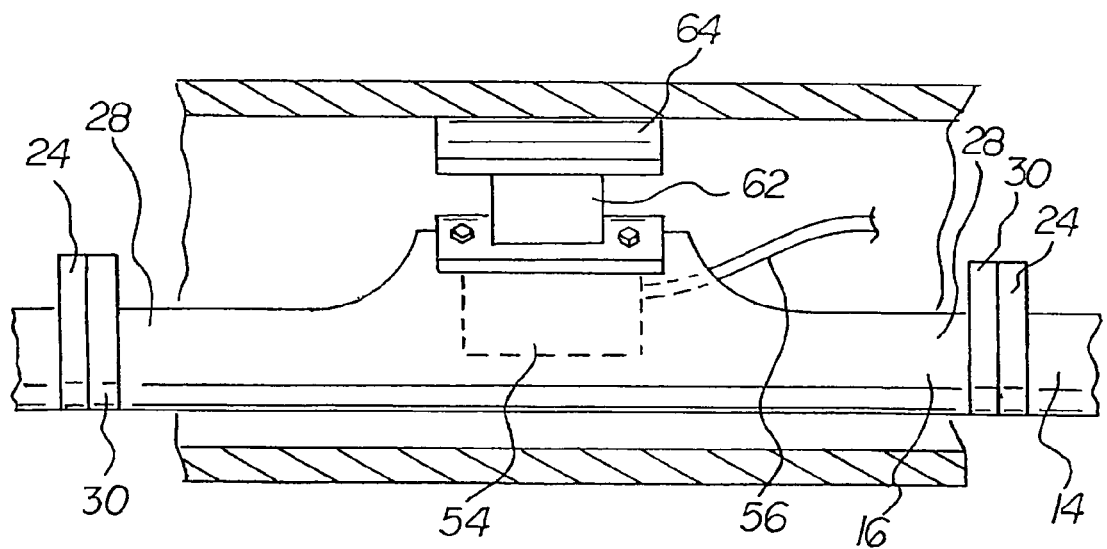
FIG 6

SAG CORRECTION SYSTEM

BACKGROUND OF THE INVENTION

1. Field of the Invention

The present invention relates to a sag correction system and more particularly pertains to eliminating sagging portions of a sewer pipe that occur after installation and extended use.

2. Description of the Prior Art

The use of pipe installation and repair systems of known designs and configurations is known in the prior art. More specifically, pipe installation and repair systems of known designs and configurations previously devised and utilized for the purpose of installing and repairing pipe through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 1,866,381 issued Jul. 5, 1932 to Ward discloses a Pipe Laying Apparatus. U.S. Pat. No. 5,522,699 issued Jun. 4, 1996 to Smith discloses a Pipe Laying Assembly. U.S. Pat. No. 6,619,886 issued Sep. 16, 2003 to Harrington discloses a System and Method for Installing Formed in Situ Localized Repair of Pipes and Conduits. Lastly, U.S. Pat. No. 6,755,592 to Jun. 29, 2004 to Janssen discloses a Device for Repairing Underground Sewers.

While these devices fulfill their respective, particular objectives and requirements, the aforementioned patents do not describe sag correction system that allows eliminating sagging portions of a sewer pipe that occur after installation and extended use.

In this respect, the sag correction system according to the present invention substantially departs from the conventional concepts and designs of the prior art, and in doing so provides an apparatus primarily developed for the purpose of eliminating sagging portions of a sewer pipe that occur after installation and extended use.

Therefore, it can be appreciated that there exists a continuing need for a new and improved sag correction system which can be used for eliminating sagging portions of a sewer pipe that occur after installation and extended use. In this regard, the present invention substantially fulfills this need.

SUMMARY OF THE INVENTION

In view of the foregoing disadvantages inherent in the known types of pipe installation and repair systems of known designs and configurations now present in the prior art, the present invention provides an improved sag correction system. As such, the general purpose of the present invention, which will be described subsequently in greater detail, is to provide a new and improved sag correction system and method which has all the advantages of the prior art and none of the disadvantages.

To attain this, the present invention essentially comprises a sag correction system. First provided is a generally semi-cylindrical housing. The housing has a first diameter. The housing is fabricated of a rigid material. The housing includes a pair of end sections and a middle section. The end and middle sections have a central recessed area. The end sections have a first outside end and second inside end. The inside ends have an inside rim. A plurality of apertures is provided through the inside rim. The middle section has a pair of equivalent outside ends. Each outside end has an outside end rim. A plurality of apertures are provided through the outside end rim. The apertures are adapted to align with the apertures of the inside rim of the end sections. The middle section has a central portion. The central portion has a full circumference. Bolts are provided. The end sections are adapted to couple to the middle section by the bolts. The bolts provided securement. The bolts are removably positionable in the aligned aperture. In this manner the transportation and assembly within a manhole before placement in the sewer pipe is facilitated.

A sewer pipe is provided. The sewer pipe has a sagging portion. The sewer pipe has a floor and a ceiling. The sewer pipe has a second diameter. The second diameter is greater than the first diameter of the housing.

A pair of elastomeric pads is provided. The elastomeric pads are fabricated of an elastomer. The elastomer is selected from the class of elastomers. The class of elastomers includes plastic and rubber, natural and synthetic, and blends of thereof. Each pad has an upper face and a lower face. The lower face has a semi-cylindrical configuration. The lower face is adapted to fit on the floor of the sewer pipe. The upper face has a hinged coupling. The coupling is adapted to couple the elastomeric pads to the outside ends of the end sections of the housing. The elastomeric pads are adapted to serve as a base for the system to rest upon when activated and held in a resting position. In this manner installation of the housing is facilitated.

Provided next is a pair of air cylinders. The air cylinders function as lifting members. Each air cylinder is positioned in the recessed area of the end sections. Each cylinder has a working arm. The working arm is coupled to the hinged coupling of the elastomeric pads. The air cylinders are adapted to raise the housing on the elastomeric pads. In this manner the central portion of the middle section is positioned to the top wall of the sewer piper adjacent to the sagging portion. In this manner elevating pressure is applied to the sagging portion.

Further provided is a vibrator. The vibrator is positioned in the central portion of the middle section of the housing. In this manner when the air cylinders are activated and the central portion of the middle section adjacent to the top wall of the ceiling of the sewer pipe, the vibrator produces vibrational energy. The vibrational energy is adapted to be transmitted through the central portion and the sewer pipe and to the surrounding bed or earth. In this manner the pipe is elevated. The vibrational energy is isolated to the area of the sagging portion by the insulating effects of the elastomeric pads.

Provided last is a plurality of control lines, a control unit and a power source. The control lines are adapted to couple the air cylinders and the vibrator to the control unit and the power source.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sag correction system which has all of the advantages of the prior art pipe installation and repair systems of known designs and configurations and none of the disadvantages.

It is another object of the present invention to provide a new and improved sag correction system which may be easily and efficiently manufactured and marketed.

It is further object of the present invention to provide a new and improved sag correction system which is of durable and reliable constructions.

An even further object of the present invention is to provide a new and improved sag correction system which is susceptible of a low cost of manufacture with regard to both materials and labor, and which accordingly is then susceptible of low prices of sale to the consuming public, thereby making such sag correction system economically available to the buying public.

Even still another object of the present invention is to provide a sag correction system for eliminating sagging portions of a sewer pipe that occur after installation and extended use.

Lastly, it is an object of the present invention to provide a new and improved sag correction system. A housing has a central recessed area with a first end and a second end. Each end has an inside rim with at least one aperture there through. The housing has an outside end with an outside end rim with at least one aperture there through. The housing has a central portion with a full circumference. At least one elastomeric pad has an upper face and a lower face. The upper face is coupled to the housing. At least one lifting member are coupled to the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a cross sectional illustration of the preferred embodiment of the present invention.

FIG. 2 is a cross sectional view taken along line 2—2 of FIG. 1 showing an end section.

FIG. 3 is a cross sectional view taken along line 3—3 of FIG. 1 showing the middle section and vibrator.

FIG. 4 is an enlarged cross sectional view of the present invention taken from circle 4 of FIG. 1 showing an elastomeric pad and cylinder.

FIG. 5 is a cross sectional view taken along line 5—5 of FIG. 4.

FIG. 6 is a cross sectional illustration of an alternative embodiment of the present invention.

The same reference numerals refer to the same parts throughout the various Figures.

DESCRIPTION OF THE PREFERRED EMBODIMENT

Figure 7:
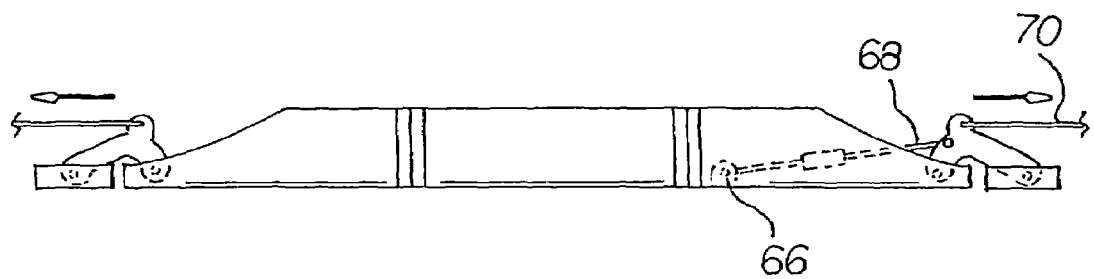
FIG. 7 is a cross sectional view of another alternative embodiment of the present invention showing the lifting means being a cable driven.

With reference now to the drawings, and in particular to FIG. 1 thereof, the preferred embodiment of the new and improved sag correction system embodying the principles and concepts of the present invention and generally designated by the reference numeral 10 will be described.

The present invention, the sag correction system 10 is comprised of a plurality of components. Such components in their broadest context include a housing, a pair of elastomeric pads and a pair of lifting members. Such components are individually configured and correlated with respect to each other so as to attain the desired objective.

First provided is a generally semi-cylindrical housing 12. The housing has a first diameter. The housing is fabricated of a rigid material. The housing includes a pair of end sections 14 and a middle section 16. The end and middle sections have a central recessed area 18. The end sections have a first outside end 20 and second inside end 22. The inside ends have an inside rim 24. A plurality of apertures 26 is provided through the inside rim. The middle section has a pair of equivalent outside ends 28. Each outside end has an outside end rim 30. A plurality of apertures 32 are provided through the outside end rim. The apertures are adapted to align with the apertures of the inside rim of the end sections. The middle section has a central portion. The central portion has a full circumference. The end sections are adapted to couple to the middle section by bolts 34. The bolts provide securement. The bolts are removably positionable in the aligned aperture. In this manner the transportation and assembly within a manhole before placement in the sewer pipe is facilitated.

A sewer pipe 36 is provided. The sewer pipe has a sagging portion 36. The sewer pipe has a floor 38 and a ceiling 40. The sewer pipe has a second diameter. The second diameter is greater than the first diameter of the housing.

A pair of elastomeric pads 42 is provided. The elastomeric pads are fabricated of an elastomer which is selected from the class of elastomers. The class of elastomers includes plastic and rubber, natural and synthetic, and blends of thereof. Each pad has an upper face 44 and a lower face 46. The lower face has a semi-cylindrical configuration. The lower face is adapted to fit on the floor of the sewer pipe. The upper face has a hinged coupling 48. The coupling is adapted to couple the elastomeric pads to the outside ends of the end sections of the housing. The elastomeric pads are adapted to serve as a base for the system to rest upon when activated and held in a resting position. In this manner installation of the housing is facilitated.

Provided next is a pair of air cylinders 50. The air cylinders function as lifting members. Each air cylinder is positioned in the recessed area of the end sections. Each cylinder has a working arm 52. The working arm is coupled to the hinged coupling of the elastomeric pads. The air cylinders are adapted to raise the housing on the elastomeric pads. In this manner the central portion of the middle section is positioned to the top wall of the sewer piper adjacent to the sagging portion. In this manner elevating pressure is applied to the sagging portion. In the primary embodiment the lifting members are air cylinders. It should be understood that the lifting members could readily be other fluid powered mechanisms such as air powered mechanisms or liquid powered mechanisms.

Further provided is a vibrator 54. The vibrator is positioned in the central portion of the middle section of the housing. In this manner when the air cylinders are activated and the central portion of the middle section adjacent to the top wall of the ceiling of the sewer pipe, the vibrator produces vibrational energy. The vibrational energy is adapted to be transmitted through the central portion and the sewer pipe and to the surrounding earth. In this manner the pipe is elevated. The vibrational energy is isolated to the area of the sagging portion by the insulating effects of the elastomeric pads.

Provided last is a plurality of control lines 56, a control unit 58 and a power source 60. The control lines are adapted to couple the air cylinders and the vibrator to the control unit and the power source.

An alternate embodiment of the present invention may be seen in the embodiment of FIG. 6. The vibrator has an extension arm 62 and a contact pad 64.

Another alternate embodiment of the present invention may be seen in the embodiment of FIG. 7. Each lifting member includes a coupling link 66, a tethering member 68 and a cable 70 whereby the lifting members are cable driven.

Figure 8:
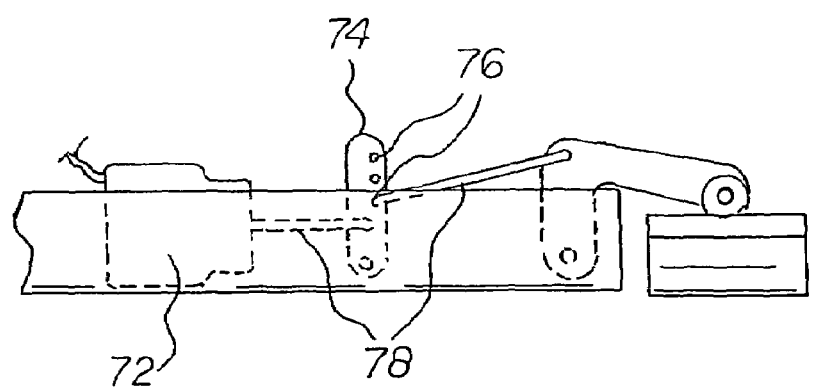
FIG. 8 is a cross sectional view of yet another alternative embodiment of the present invention showing the lifting means being a driven by an air diaphragm.

The final alternate embodiment of the present invention may be seen in the embodiment of FIG. 8. Each lifting member includes an air diaphragm 72 and an adjustable lever bar 74. Each lifting member includes a plurality of coupling apertures 76 and a pair of linkage arms 78 whereby the lifting members are a driven by an air diaphragm.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sag correction system comprising:
   a housing including a pair of end sections and a middle section all having a central recessed area, each end section having a first end and second end with each second end having an inside rim with a plurality of apertures there through, the middle section having outside ends with outside end rims with a plurality of apertures there through, the middle section having a central portion with a full circumference;
   a plurality of elastomeric pads with each pad having an upper face and a lower face, each upper face coupled to the housing; and
   a plurality of lifting members coupled to the housing.

2. The sag correction system as set forth in claim 1 wherein the lower face of the elastomeric pad is shaped in a semi cylindrical configuration and adapted to fit on the floor of a sagging sewer pipe.

3. The sag correction system as set forth in claim 1 and further including at least one control line being adapted to couple the lifting member to a control unit and a power source.

4. The sag correction system as set forth in claim 1 wherein the lifting member is a fluid powered.

5. The system as set forth in claim 4 wherein the lifting member is air powered.

6. The system as set forth in claim 4 wherein the lifting member is liquid powered.

7. The sag correction system as set forth in claim 1 and further including a vibrator positioned within the housing.

8. The sag correction system as set forth in claim 1 wherein the vibrator has an extension arm and a contact pad.

9. The sag correction system as set forth in claim 1 wherein the lifting member includes a coupling link and a tethering member and a cable.

10. The sag correction system as set forth in claim 1 wherein the lifting member includes an air diaphragm and an adjustable lever bar with a plurality of coupling apertures and a pair of linkage arms.

11. A sag correction system for eliminating sagging portions of a sewer pipe that occur after installation and extended use comprising, in combination:
   a generally semi-cylindrical housing with a first diameter and fabricated of a rigid material, the housing including a pair of end sections and a middle section all having a central recessed area, the end sections having a first outside end and second inside end with the inside ends having an inside rim with a plurality of apertures there through, the middle section having a pair of equivalent outside ends each with an outside end rim and a plurality of apertures adapted to align with the apertures of the inside rim of the end sections, the middle section having a central portion having a full circumference, the end sections being adapted to couple to the middle section by bolts for securement purposes, the bolts being removably positionable in the aligned aperture to facilitate the transportation and assembly within a manhole before placement in a sewer pipe which has a sagging portion as well as a floor and a ceiling, the sewer pipe having a second diameter with the second diameter being greater than the first diameter of the housing;
   a pair of elastomeric pads with each pad having a upper face and a lower face with the lower face having a semi-cylindrical configuration and adapted to fit on the floor of the sewer pipe, the upper face having a hinged coupling adapted to couple the elastomeric pads to the outside ends of the end sections of the housing, the elastomeric pads being adapted serve as a base for the system to rest upon when activated and held in a resting position to facilitate installation of the housing;

a pair of air cylinders functioning as lifting members, each being positioned in the recessed area of the end sections and having a working arm coupled to the hinged coupling of the elastomeric pads, the air cylinders being adapted to raise the housing on the elastomeric pads thereby positioning the central portion of the middle section to the top wall of the sewer piper adjacent to the sagging portion and thereby applying elevating pressure to the sagging portion;

a vibrator positioned in the central portion of the middle section of the housing such that when the air cylinders are activated and the central portion of the middle section adjacent to the top wall of the ceiling of the sewer pipe, the vibrator will produce vibrational energy adapted to be transmitted through the central portion and the sewer pipe and to the surrounding earth to facilitate the elevation of the pipe, the vibrational energy being isolated to the area of the sagging portion by the insulating effects of the elastomeric pads; and a plurality of control lines adapted to couple the air cylinders and the vibrator to a control unit and a power source.

* * * * *